United States Patent [19]

Motoori et al.

[11] 4,322,147
[45] Mar. 30, 1982

[54] DATA RECORDING DEVICE

[75] Inventors: Ryuzo Motoori, Kawasaki; Nobuyoshi Hagyuda, Tokyo, both of Japan

[73] Assignee: Nippon Kogaku K.K., Tokyo, Japan

[21] Appl. No.: 169,376

[22] Filed: Jul. 16, 1980

[30] Foreign Application Priority Data

Jul. 31, 1979 [JP] Japan ................. 54-104732

[51] Int. Cl.³ ............................................ G03B 17/24
[52] U.S. Cl. .................................................... 354/106
[58] Field of Search ............................. 354/105–109; 352/90, 92; 355/39, 40; 346/107 B

[56] References Cited

U.S. PATENT DOCUMENTS 4,053,909 10/1977 Shinoda et al. ...................... 354/105
4,198,146 4/1980 Taguchi et al. ..................... 354/106

Primary Examiner—L. T. Hix
Assistant Examiner—William B. Perkey
Attorney, Agent, or Firm—Fitzpatrick, Cella, Harper & Scinto

[57] ABSTRACT

A data recording device for a camera comprises a time signal generator for generating time-sequential time signals, display means changing the content of display in response to said time signal, a recording signal generator for generating a recording signal of a determined duration for causing the exposure of the display of said display means onto a photographic film and delay means for delaying the entry of said time signal into said display means until the termination of said recording signal in case said time signal is released during the continuation of said recording signal.

3 Claims, 3 Drawing Figures

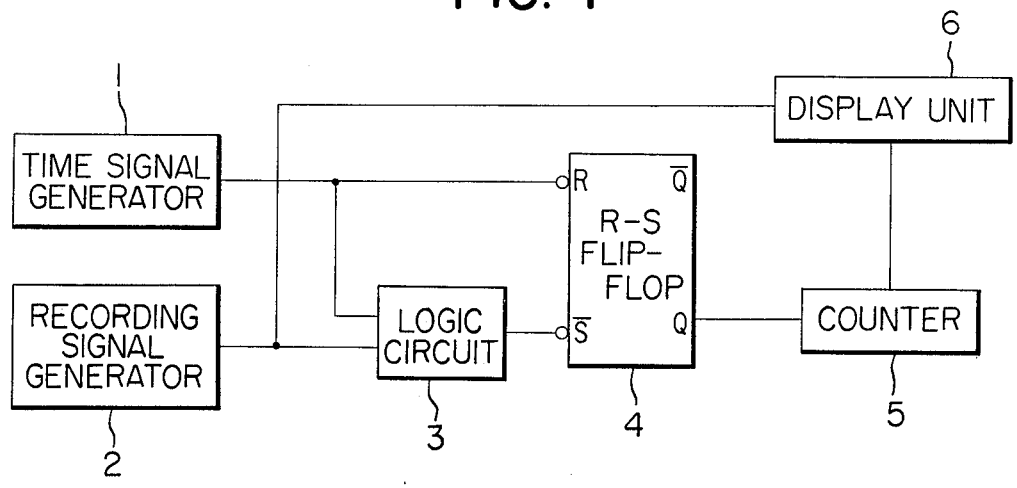
FIG. 1
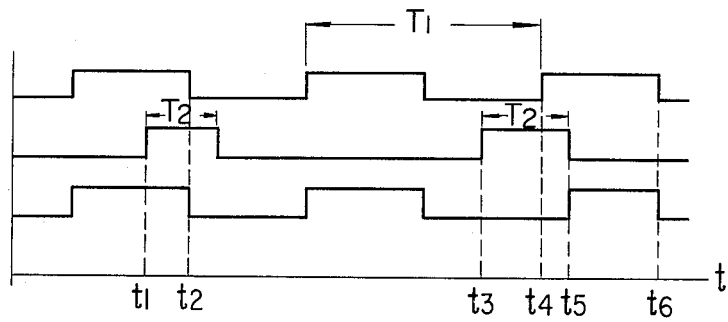
FIG. 2A
FIG. 2B
FIG. 2C
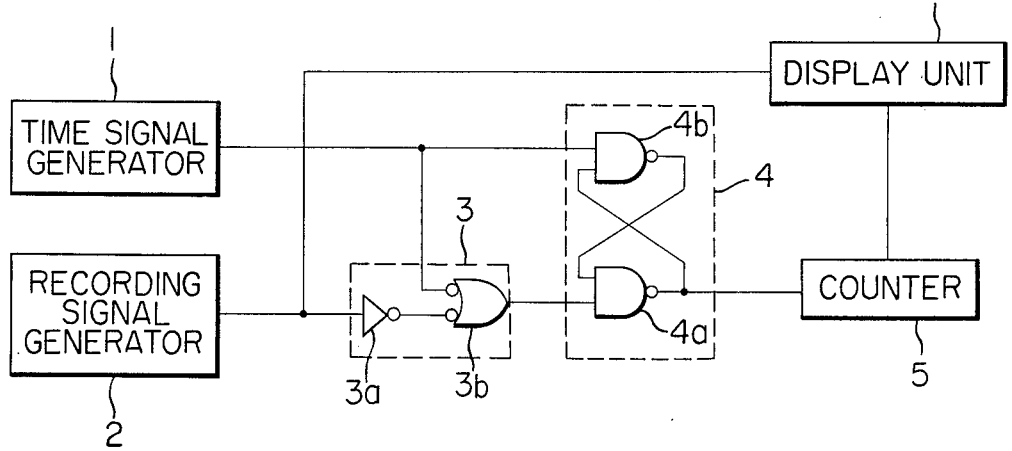
FIG. 3

DATA RECORDING DEVICE

BACKGROUND OF THE INVENTION

1. Field of the Invention

The present invention relates to a data recording device for recording information changing in time such as the information of a digital clock provided in a camera onto a photographic film contained therein.

2. Description of the Prior Art

In the conventional recording device of this kind the recorded data may become illegible because of superposed different numerals if a signal for changing the data is released during the period of data recording. Also, erroneous identification of the recorded data may result in a case where seven-segment display units are employed.

SUMMARY OF THE INVENTION

The object of the present invention is to provide a data recording device not associated with such drawbacks and capable of providing exact data recording with a simple circuit.

BRIEF DESCRIPTION OF THE DRAWINGS

FIG. 1 is a block diagram of the circuit embodying the present invention;

FIGS. 2A-2C are charts showing signals in the circuit shown in FIG. 1; and

FIG. 3 is a circuit diagram showing an example of the block diagram shown in FIG. 1.

DESCRIPTION OF THE PREFERRED EMBODIMENTS

The present invention will now be clarified in detail by an embodiment thereof in which the time data are to be recorded.

Referring to FIG. 1, a time signal generator 1 generates pulses of a determined period T1 as shown in FIG. 2A, with a duty ratio of 50%. As will be explained later, time to be displayed is changed with the leading edge of end pulse. So the leading edge of the pulse is utilized as the time signal for changing the displayed time data.

A recording signal generator 2 generates a recording pulse of a determined duration T2 as shown in FIG. 2B in response to the shutter release operation. The data are exposed to the film during the continuation of said recording signal, so that the data exposure time is determined by the duration T2 of the pulse. The pulse duration T2 is selected so as to be shorter than ½ of the interval T1 of the aforementioned time signals, to order to prevent the double exposure of different time data.

A logic circuit 3, receiving the output signals from said time signal generator 1 and recording signal generator 2, generates an inverted signal of the output from the time signal generator 1 during the absence of the recording signal, i.e. when the output of the recording signal generator 2 is at the low (L) level state. In the presence of the recording signal, i.e. when the output from the recording signal generator 2 is at the high (H) level state, the logic circuit 3 generates an H-level signal regardless of the output from the time signal generator 1, thus forbidding the entry of a set signal to an R-S flip-flop 4 during the presence of the recording signal.

The R-S flip-flop 4, receiving the input signals from the time signal generator 1 and the logic circuit 3, generates output signals as shown in FIG. 2C.

A counter 5 counts the leading edges of the pulses from the R-S flip-flop 4. It is also possible to count the trailing edges of said pulses by means of the output $\overline{Q}$ of the flip-flop 4.

A display unit 6 receives the output signals from the recording signal generator 2 and the counter 5, and displays the time data contained in said counter 5, thus causing exposure thereof onto the photographic film during the continuation of the recording signal. The display unit 6 may be composed either of light-emitting element such as light-emitting diodes or lamps, or of elements displaying the content of the counter 5 such as liquid crystal or electrochromic elements and a light source for illuminating said displaying elements during the recording signal.

The function of the above-explained circuit is as follows. During the absence of the recording signal, the logic circuit 3 generates inverted signals of the output from the time signal generator 1, so that the R-S flip-flop 4 receives pulse signals of inverted polarity respectively at the set input terminal S and the reset input terminal R. Consequently the flip-flop 4 releases the output signal identical with the time signal during the absence of the recording signal. In response to a recording signal generated at a time t1 as shown in FIG. 2B, the logic circuit 3 releases an H-level output signal which is supplied to the set input terminal of the flip-flop 4. However the output thereof remains in the H-level as shown in FIG. 2C since the reset input signal thereto is also at H-level in this state. When the output from the time signal generator 1 is shifted to the L-level at a time t2, the output of the R-S flip-flop 4 is likewise shifted to the L-level, but the counter 5 retains the content thereof unchanged as it is controlled by the leading edges of the input pulses thereto. Consequently the data displayed by the display unit 6 remain unchanged during the continuation of the recording signal starting from the time t1.

Now there will be explained a case in which the output of the time signal generator 1 is shifted to the H-level to generate a time signal during the continuation of a recording signal from t3 to t5. Immediately prior to the time t3, the time signal generator 1 releases an L-level output to give an H-level output signal from the logic circuit 3. Also at this moment the flip-flop 4 releases an L-level output signal. When the recording signal generator 2 generates an H-level recording signal at the time t3 as shown in FIG. 2B, the logic circuit 3 retains the H-level output to maintain the output of the flip-flop 4 at the L-level. At the time t4 the output of the time signal generator 1 is shifted to the H-level as shown in FIG. 2A, but the flip-flop 4 retains the L-level output as shown in FIG. 2C since the output from the logic circuit 3 remains in the H-level.

In this manner the state of the flip-flop 4 remains unchanged even when the time signal to the reset input terminal thereof is changed from the L-level to H-level since the set input to the flip-flop 4 is maintained at the H-level during the continuation of the recording signal. Consequently the content of the counter 5 or the display of the display unit 6 is not changed by the time signal released during the period T2 of the recording signal. Upon termination of the recording signal at the time t5, the output of the recording signal generator 2 is shifted to the L-level, whereby the output of the flip-flop 4 is also shifted from the L-level to H-level, said shift being counted by the counter 5. In this manner the time signal generated at the time t4 is delayed by a period t5−t4 and supplied to the counter 5 after the termination of the recording signal.

In case the recording signal has a longer duration and is terminated after the trailing edge t6 of the output pulse from the time signal generator 1, the time signal at the time t4 is not supplied to the counter because of the L-level output of the time signal generator 1 at said time t6 to retain the output of the flip-flop 4 unchanged. In order to avoid such inconvenience the duration of the recording signal is selected shorter than t½.

In the foregoing embodiment the logic circuit 3 is designed to generate an H-level output in the presence of the recording signal because of the use of an R-S flip-flop which is set and reset by L-level signals, but the logic circuit 3 is required to release an L-level output in such condition in case there is employed an R-S flip-flop to be set and reset by H-level signals. Also the information to be displayed is not limited to the time data but can be any other data changing with time.

FIG. 3 shows an example of the structure of the logic circuit 3 and the flip-flop 4 shown in FIG. 1. The logic circuit 3 is composed of an inverter 3a and a NAND gate 3b, while the R-S flip-flop 4 is composed of two NAND gates 4a and 4b.

We claim:

1. A data recording device for a camera, comprising:
   a time signal generator for generating time-sequential time signals;
   display means changing the content of its display in response to said time signal;
   a recording signal generator for generating a recording signal of a determined duration for causing an exposure of the display of said display means onto a photographic film; and
   a delay means delaying entry of one of said time signals into said display means until termination of said recording signal in case said time signal is released during continuation of the recording signal.

2. A data recording device according to claim 1, wherein said one of said time signals is a pulse signal of a determined interval, said recording signal is a pulse signal of a duration shorter than ½ of the interval of one of said time signals, and said delay means comprises a logic circuit and an R-S flip-flop, wherein said logic circuit receives the recording signal and one of said time signals and is adapted to release an inverted output of said time signal in an absence of said recording signal and to release an output of a determined level in the presence of said recording signal, while said R-S flip-flop controls the display means in response to the outputs from said logic circuit and said time signal generator.

3. A data recording device according to the claim 2, wherein said display means comprises a counter for counting the output signals from the R-S flip-flop and a display unit capable of displaying a content of said counter upon receipt of a recording signal.

* * * * *